J. SACHS.
ALTERNATING CURRENT SYNCHRONOUS DYNAMO ELECTRIC MACHINE.
APPLICATION FILED NOV. 27, 1911.
1,125,728.
Patented Jan. 19, 1915.
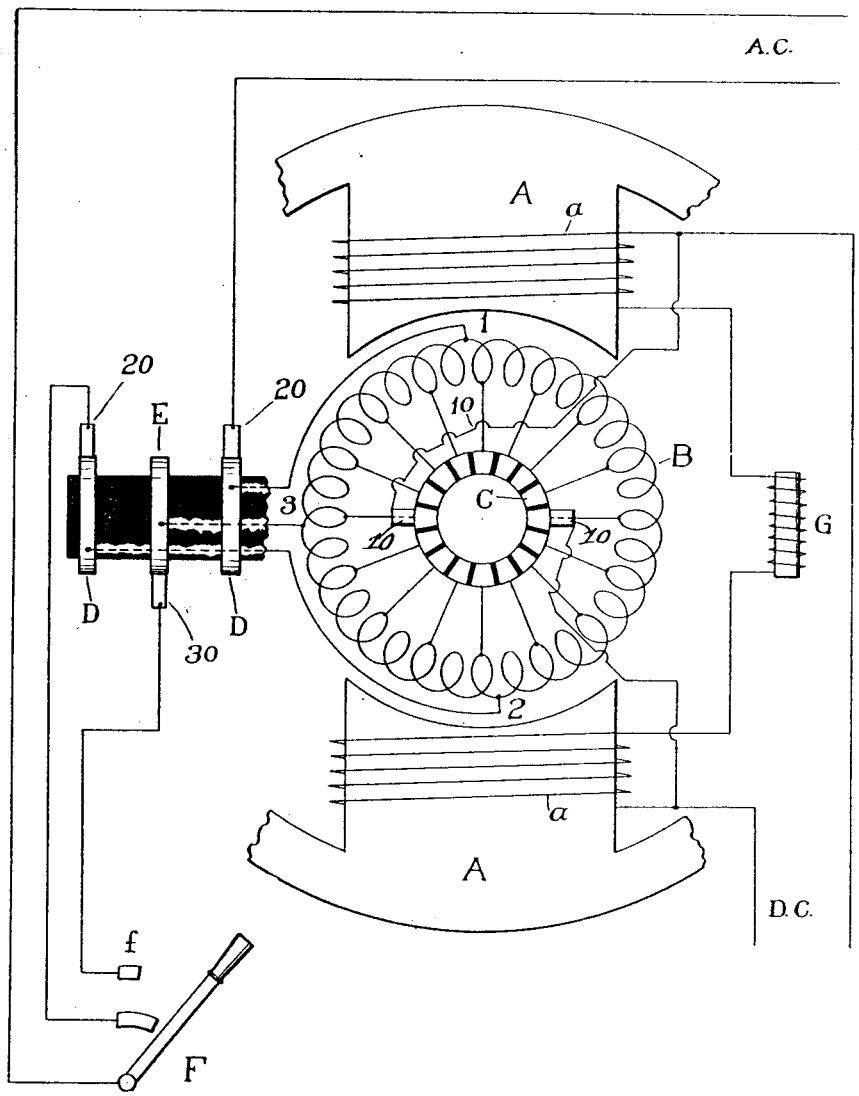
INVENTOR
Joseph Sachs.

UNITED STATES PATENT OFFICE.

JOSEPH SACHS, OF HARTFORD, CONNECTICUT, ASSIGNOR, BY MESNE ASSIGNMENTS, TO THE HART & HEGEMAN MANUFACTURING COMPANY, OF HARTFORD, CONNECTICUT, A CORPORATION OF CONNECTICUT.

ALTERNATING-CURRENT SYNCHRONOUS DYNAMO-ELECTRIC MACHINE.

1,125,728.              Specification of Letters Patent.      Patented Jan. 19, 1915.

Application filed November 27, 1911. Serial No. 662,586.

*To all whom it may concern:*

Be it known that I, JOSEPH SACHS, a citizen of the United States, and a resident of Hartford, county of Hartford, State of Connecticut, have invented certain new and useful Improvements in Alternating-Current Synchronous Dynamo-Electric Machines, of which the following is a specification.

Dynamo electric machines, in which my invention may be embodied are of what are known as the synchronous type, that is, the movement of the armature in relation to the field poles is in synchronism with the movement or change or alternations of the current supplied to the machine and, in the particular form shown in this application the invention is embodied in a synchronous dynamo electric machine in which the field magnet structure forms the stator or stationary element of the machine while the armature forms the rotor or moving element of the machine.

My invention is particularly applicable to such machines when used as motors, or as converters for converting alternating current to direct current through the medium of a rotating armature receiving the alternating current through suitable collector rings and giving off direct current from a commutator also connected to the armature windings.

In the operation of synchronous alternating current motors or converters, it is necessary to in some manner impart to the rotating element or armature such motion, that the relationship, established between the alternating poles produced in the armature by the alternating current supplied thereto and the fixed poles of the field magnet structure, is such as to effect the proper coöperative action and produce the necessary torque effect between the two members of the machine. This has been accomplished heretofore in various ways. In the case of alternating current synchronous motors the armature or rotating element of the machine has been brought up to synchronous speed by means of power from an additional motor or other source after the attainment of which synchronous speed the armature of the synchronous motor would be connected to the supply line and continue to operate in synchronism with the current alternations supplied to it. Another method has been to provide the machine with additional windings by means of which the machine may be started and brought up to synchronous speed after which the main windings would be connected to the supply line.

In the case of the so called A. C.-D. C. synchronous rotary converters common methods have been either to bring the armature of the machine up to synchronous speed by means of power applied from an external source or, where it is possible, the machine is started and brought up to synchronous speed by a direct current supplied to the commutator end of the armature and, after the attainment of which synchronous speed, the alternating current line would be connected to the collector rings on the alternating side of the armature and the machine would then operate in synchronism with the alternating current supplied to it, which alternating current would be converted to a direct current at the commutator.

By my invention I provide means whereby it is possible to start and bring into synchronous operation such synchronous motors or synchronous alternating-direct current converters without using a starting motor or mechanical power from an external source, without supplying any direct current from an external source to the field or armature windings of the machine, and without any special or separate windings, or changes in the windings, of the machine, for starting purposes.

The figure of the drawing illustrates diagrammatically an embodiment of my invention.

The machines embodying my invention may be called self starting synchronous alternating current motors or converters. Whether used as an alternating current synchronous motor for the purpose of delivering mechanical power from its rotary shaft, or as a sychronous A. C.-D. C. rotary converter, the general arrangement of the machine remains the same, consisting of two elements, the field magnet A which may be either bi-polar or multi-polar, and the armature B having its windings suitably connected to a commutator C and to which windings are also connected suitable collector rings at such points as may be required by the character of the supply system. For instance, in the case illustrated where the machine is of the bi-polar type and receives current from a single phase circuit, two main or running collector rings D—D are provided connected at diametrically opposite points on the armature winding as indicated at 1—2. Thus far, so far as concerns the armature, the arrangement is similar to that used with any synchronous A. C.-D. C. converter armature. In addition, however, to the two running collector rings D—D ordinarily provided on the alternating current side of the single phase A. C.-D. C. converter armature, the armature of the machine embodying my invention is provided with a third or starting collector ring E connected at some point, preferably midway between the points on the armature winding to which the two other collector rings are connected indicated at 3.

Suitable brushes are provided for the commutator and collector rings, 10—10 denoting the commutator brushes across which the circuit containing the field magnet exciting winding $a$ is connected in shunt, 20—20 denoting the brushes contacting with the running collector rings D—D to which the alternating current line is connected through a suitable switch F, 30 denoting the brush contacting with the starting collector ring E and which is connected to an additional point $f$ in the switch. The construction of the switch is not material so long as it provides means whereby the circuit from the single phase alternating current line may be completed through the two running brushes and their connected armature and field winding circuits, and simultaneously therewith from one side or the other of the supply circuit a connection may be completed through the third or starting collector ring which additional connection, namely, of the supply circuit with the starting collector ring, may be discontinued after the machine has attained the proper running condition.

In the circuit containing the field magnet windings and in series therewith an inductance G of suitable size and character may be included. This inductance facilitates or insures the starting of the armature or rotor of the machine irrespective of its static position in relation to the field magnet poles. After the machine has attained its synchronous running condition this inductance may be cut out of the field circuit or it may remain in the circuit and, if desired, it may be of such character as to utilize the manifestations produced by passing through it the direct current of the field magnet winding circuit taken from the commutator of the armature when the machine is running synchronously. Under this starting condition the alternating current passes through the armature, and by reason of the commutator brushes, through the field winding circuit. The A. C. also passes to the armature through the starting brush and collector ring connected to the armature as described. This causes the polar axis of the armature as it exists before this condition is brought about to be shifted or distorted. By reason of the A. C. thus directly supplied to the armature and field magnet winding circuit through these connections, and the inductive effect of the armature upon the field windings, magnetic polar relations of such a nature are established in the armature and the field structure that the armature is started into movement and, as it may be called, pulled into synchronous speed with the alternations of the alternating current in the supply circuit. From the instant that this synchronous speed is attained the current, converted by the commutator to a direct current, continues to flow through the field winding circuit as a direct current and the machine will then continue to operate synchronously with the A. C. alternations, at which time the third or starting connection is or may be opened.

When the machine is used as a motor only, the commutator and its brushes need only be large enough to supply the current necessary for the field excitation. Where the machine is to be used as a rotary A. C.-D. C. converter the commutator and brushes are made up sufficiently large to take care of the current output at the direct current end of the machine and a suitable circuit containing any desired translating devices may be connected to these commutator brushes.

It will be understood that a machine embodying my invention may be multi-polar as well as bi-polar, suitable brushes and winding connections being provided.

I claim as my invention:

1. The herein described method of starting alternating current synchronous dynamo electric machines which consists in supplying additional alternating current to the armature windings between the points at which the A. C. utilized for the regular operation of the machine is connected and at the same time supplying alternating current to the field.

2. The herein described method of starting alternating current synchronous dynamo electric machines which consists in supplying alternating current to the windings of an armature in such manner as to produce a shifting or displacement of the magnetic poles, and at the same time supplying alternating current through the commutator and brushes to the field winding.

3. The herein described method of starting alternating current synchronous dynamo electric machines which consists in supplying alternating current to the armature windings through suitably spaced running connections, to the field windings, and also to the armature windings at an additional point located between the running connections, thus bringing the rotor of the machine into synchronous operation with the supplied alternating current, and subsequently cutting off the supply of alternating current at the additional point.

4. The herein described method of operating machines of the character described which consists in passing an alternating current to the windings of an armature at suitably spaced points and through a commutator and its brushes into the field windings and simultaneously passing alternating current into said armature windings at an additional point.

5. The herein described method of operating machines of the character described which consists in passing an alternating current to the windings of an armature at suitably spaced points and through a commutator and its brushes into the field windings and simultaneously passing alternating current into said armature windings at an additional point and subsequently cutting off the supply of alternating current to the additional point of connection.

6. In machines of the character described an armature and its windings, a direct current commutator connected therewith, and its brushes, a field magnet winding connected to said brushes, running collector rings connected to the armature winding at suitably spaced points and adapted to receive alternating current, a starting collector ring connected to said armature winding and adapted to receive alternating current, and means for controlling the supply of current to the running and starting rings independently.

7. In machines of the character described, an armature and its windings, a direct current commutator connected therewith, and its brushes, a field magnet winding connected to said brushes, an external inductance connected into the circuit containing the windings of said field magnet, running collector rings connected to the armature winding at suitably spaced points and adapted to receive alternating current, a starting collector ring connected to said armature winding at a point between the points of connection of said running collector rings therewith, and means for controlling the current to the running and starting rings independently.

8. In machines of the character described, a stationary field magnet, and windings therefor, a rotating armature, closed coil windings thereon, a pair of running collector rings connected to the armature windings at suitably spaced points, brushes therefor adapted to receive alternating current and deliver it to the armature windings, a starting collector ring connected to the armature windings at a point between the connections therewith of the running collector rings, a brush for the starting collector ring, a commutator connected to the armature windings, brushes therefor, said field magnet windings being connected to said brushes, a source of supply of alternating current, a controller to close the connection from said supply to the running collector rings and for making and breaking the connection to the starting collector ring while the connection with the running collector rings remains closed.

9. The herein described method of starting alternating current synchronous dynamo electric machines which consists in supplying additional alternating current to the armature windings between the points at which the A. C. utilized for the regular operation of the machine is connected, and at the same time supplying alternating current to a field circuit containing the field magnet exciting windings and an inductance.

10. The herein described method of starting alternating current synchronous dynamo electric machines which consists in supplying alternating current to the windings of an armature in such manner as to produce a shifting or displacement of the magnetic poles, and at the same time supplying alternating current through the commutator and brushes to a field circuit containing the field magnet exciting windings and an inductance.

11. The herein described method of starting alternating current synchronous dynamo electric machines which consists in supplying alternating current to the armature windings through suitably spaced running connections, to a field circuit containing the field magnet exciting windings and an inductance, and also to the armature windings at an additional point located between the running connections, thus bringing the rotor of the machine into synchronous operation with the supplied alternating current and subsequently cutting off the supply of alternating current at the additional point.

12. The herein described method of operating machines of the character described which consists in passing an alternating current to the windings of an armature at suitably spaced points and through a commutator and its brushes into a field circuit containing the field magnet exciting windings and an inductance and simultaneously passing alternating current into said armature windings at an additional point.

13. The herein described method of operating machines of the character described which consists in passing an alternating current to the windings of an armature at suitably spaced points and through a commutator and its brushes into a field circuit containing the field magnet exciting windings and an inductance, and simultaneously passing alternating current into said armature windings at an additional point, and subsequently cutting off the supply of alternating current to the additional point of connection.

14. In machines of the character described, a stationary field magnet, windings therefor, an external inductance, a rotating armature, closed coil windings thereon, a pair of running collector rings connected to the armature windings at suitably spaced points, brushes therefor adapted to receive alternating current and deliver it to the armature windings, a starting collector ring connected to the armature windings at a point between the connection therewith of the running collector rings, a brush for the starting collector ring, a commutator connected to the armature winding, brushes therefor, said field magnet windings and the external inductance being connected to said brushes, a source of supply of alternating current, a controller to close the connection from said supply to the running collector rings and for making and breaking the connection to the starting collector ring while the connection with the running collector rings remains closed.

15. In a synchronous dynamo electric machine an armature provided with a closed coil winding, means for supplying running A. C. to the armature windings at suitably spaced points, means for supplying additional starting A. C. to said winding at a point between the points to which the running A. C. is supplied, means for supplying D. C. from the windings of said armature and a field magnet and its windings, said windings being connected so as to be supplied with A. C. when the machine is started and with D. C. after the machine has reached its running condition.

16. In a synchronous dynamo electric machine, a stator and a rotor element, windings for each of said elements, means for supplying A. C. to both of said windings at substantially the same time, additional means associated with one of said elements for supplying it with starting A. C. to bring the rotor into synchronous operation, and means associated with said rotor for converting the A. C. in its windings to D. C. and supplying said D. C. to the windings of the stator.

17. In a synchronous dynamo electric machine a field magnet and its windings, an inductance connected in series with said windings, an armature and its windings, means for supplying running A. C. and at substantially the same time supplying an additional amount of A. C. to the armature windings and means whereby the circuit containing the field windings and inductance is supplied with direct current from the armature after the machine has attained its running condition.

18. An armature provided with suitable windings, running collector rings, a starting collector ring, and a commutator, a field magnet provided with windings, means for supplying A. C. to the armature windings through the running collector rings and an additional amount of A. C. through the starting collector ring and thereby supplying A. C. to the field magnet windings, and means whereby the supply of A. C. to the armature winding through the starting collector ring may be discontinued after the running condition has been attained.

19. In a synchronous dynamo electric machine an armature provided with windings, running collector rings, a starting collector ring and a commutator, means for supplying A. C. to the armature windings through the running collector rings, means for supplying additional A. C. to the armature windings through the starting collector ring, a field magnet and its windings, an inductance, said windings and inductance being connected in series across the commutator of the armature and receiving A. C. under the started condition of the machine and means whereby the supply of additional A. C. to the armature windings at the starting collector ring may be discontinued after the running condition has been attained.

JOSEPH SACHS.

Witnesses:
M. A. Shuckerow,
H. E. Hart.